(12) United States Patent
Ansley

(10) Patent No.: US 9,258,298 B2
(45) Date of Patent: Feb. 9, 2016

(54) SIMPLIFIED CONFIGURATION OF A NETWORK DEVICE

(71) Applicant: ARRIS Group, Inc., Suwanee, GA (US)

(72) Inventor: Carol J. Ansley, Johns Creek, GA (US)

(73) Assignee: ARRIS Enterprises, Inc., Suwanee, GA (US)

( * ) Notice: Subject to any disclaimer, the term of this patent is extended or adjusted under 35 U.S.C. 154(b) by 0 days.

(21) Appl. No.: 14/196,681

(22) Filed: Mar. 4, 2014

(65) Prior Publication Data

US 2014/0250509 A1 Sep. 4, 2014

Related U.S. Application Data

(60) Provisional application No. 61/772,242, filed on Mar. 4, 2013.

(51) Int. Cl.
*H04L 29/06* (2006.01)
*H04W 12/06* (2009.01)
*H04L 12/24* (2006.01)

(52) U.S. Cl.
CPC .......... *H04L 63/083* (2013.01); *H04L 41/0806* (2013.01); *H04L 41/0846* (2013.01); *H04L 41/0886* (2013.01); *H04W 12/06* (2013.01)

(58) Field of Classification Search
CPC .......................... H04L 41/0816; H04L 63/083
USPC ............................................................. 726/6
See application file for complete search history.

(56) References Cited

U.S. PATENT DOCUMENTS

2004/0052216 A1* 3/2004 Roh ............................. 370/252
2013/0272164 A1* 10/2013 Leonardos et al. ........... 370/254

* cited by examiner

*Primary Examiner* — Peter Shaw
(74) *Attorney, Agent, or Firm* — Bart A. Perkins

(57) ABSTRACT

Methods, systems, and computer readable media can be operable to pair a client device with a CPE device. The methods, systems and computer readable media described in this disclosure can enable the pairing of a client device with a CPE device upon a connection of the client device to a whole-network associated with the CPE device. Further, methods, systems and computer readable media can enable the secure pairing of a client device with a CPE device with little to no user-input.

18 Claims, 6 Drawing Sheets

SIMPLIFIED CONFIGURATION OF A NETWORK DEVICE

CROSS REFERENCE TO RELATED APPLICATION

This application is a non-provisional application claiming the benefit of U.S. Provisional Application Ser. No. 61/772,242, entitled "MoCA Setup and WiFi Pairing," which was filed on Mar. 4, 2013, and is incorporated herein by reference in its entirety.

TECHNICAL FIELD

This disclosure relates to configuring a network device.

BACKGROUND

As more and more devices become reliant on access to a network to provide services, the security and efficiency involved in the pairing of these devices in the home to a whole-home network becomes increasingly more important. When a user wants to connect a device to a whole-home network, the user generally must identify a network or access point to connect to, and must further input a password associated with the identified network or access point. The password requirement can preclude users or devices that are not subscribed to a service from receiving said service, and the preclusion of unsubscribed users or devices can improve a user's quality of experience associated with a service and can provide security against an aftermarket or grey market in network devices owned by service providers.

Wi-Fi protected setup (WPS) is a network security standard that attempts to provide an efficient and user-friendly method for connecting a device to a whole-home network. The WPS standard temporarily opens an access point so that any device, including devices that are not provisioned to use the access point, can connect to the access point. This window of vulnerability may present security challenges. Therefore, it is desirable to improve upon systems and methods for pairing devices to a network.

BRIEF DESCRIPTION OF THE DRAWINGS

Like reference numbers and designations in the various drawings indicate like elements.

DETAILED DESCRIPTION

In embodiments, methods, systems, and computer readable media can be operable to pair a client device with a CPE device. The methods, systems and computer readable media described in this disclosure can enable the pairing of a client device with a CPE device upon a connection of the client device to a whole-network associated with the CPE device. Further, methods, systems and computer readable media can enable the secure pairing of a client device with a CPE device with little to no user-input.

In embodiments, this disclosure describes a configuration for devices associated with a whole-home network that enables an optimization of subscriber self-installation of client devices. In embodiments, flow-through provisioning of a device can be enabled by retrieving a network password through an unencrypted, wireless network connection.

Figure 1:
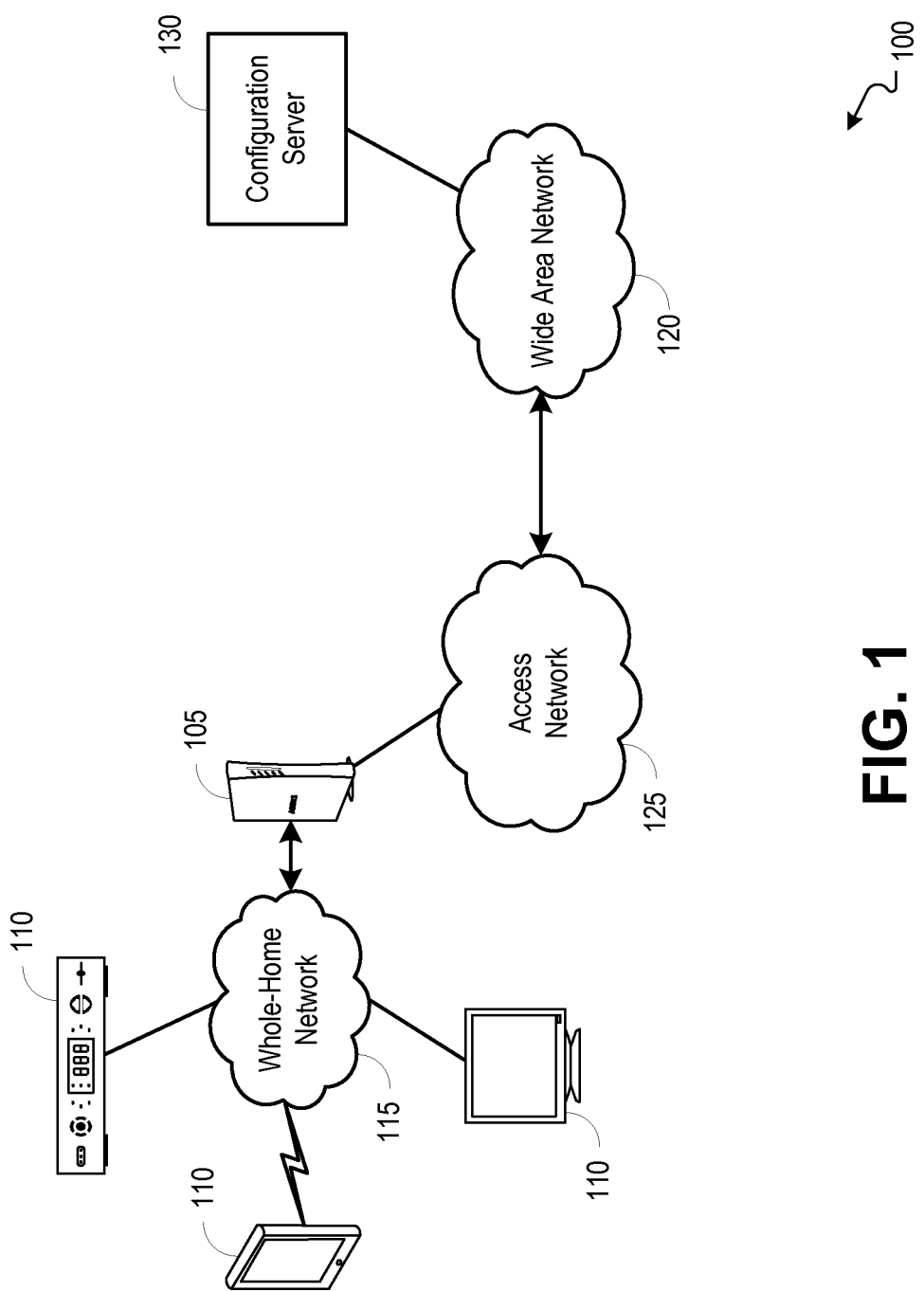
FIG. 1 is a block diagram illustrating an example network environment operable to facilitate the pairing of a client device with a network service while minimizing user-input.

FIG. 1 is a block diagram illustrating an example network environment 100 operable to facilitate the pairing of a client device with a network service while minimizing user-input. In embodiments, a customer premise equipment (CPE) device 105 can route communications to and from one or more client devices 110. For example, the one or more client devices 110 can be provisioned to receive video service(s) and/or data service(s) through one or more CPE devices 105. In embodiments, a CPE device 105 can include a gateway, a cable modem, a wireless router including an embedded cable modem, a digital subscriber line (DSL) modem, a mobile hot-spot router, a multimedia over coaxial alliance (MoCA) node, and any other device that is operable to route communications to and from a client device 110.

In embodiments, client devices 110 can include a wide variety of devices such as televisions, mobile devices, tablets, IP set-top boxes, computers, and any other device that is capable of utilizing a video or data service. The client devices 110 can be provided to a subscriber by a service provider or can be a device that is provided by a source other than the service provider. In embodiments, the client devices 110 can communicate with a CPE device 105 via a whole-home network 115 (e.g., MoCA network, wireless local area network (WLAN), etc.).

In embodiments, a CPE device 105 can route communications between client device(s) 110 and a wide area network (WAN) 120 via an access network 125. In embodiments, the access network 125 can include various networks such as coaxial cable, optical fiber, twisted pairs, wireless networks including 4G and LTE, and others.

In embodiments, a WAN 120, for example, can operate using internet protocol (IP), directing data packets to and receiving data packets from a CPE device 105. In further examples, one or more video and/or data sources may provide streaming data through the WAN 120 to a CPE device 105.

In embodiments, a CPE device 105 or a client device 110 can retrieve information from a configuration server 130 via a WAN 120. For example, information retrieved from a configuration server 130 can include service set identifiers (SSIDs), passwords, information identifying client devices 110 having permission to access a specific CPE device 105, information associating a client device 110 with a specific CPE device 105, instructions for choosing a CPE device 105 to connect to, and other information. In embodiments, configuration information can be controlled and operated by service or content providers through billing or customer management systems. For example, billing or customer management systems can update configuration information within a configuration server 130 to inform a CPE device 105 as to specific services that a client is subscribed or authorized to receive.

In embodiments, a CPE device 105 can provide one or more wireless networks with one or more SSIDs for client devices 110 to access. Each of the one or more SSIDs can have various characteristics, requirements, and limitations depending on the intended function of the SSID. For example, a CPE device 105 can provide one or more of the following SSID types: general use SSID, configuration SSID, video SSID, hot-spot SSID, as well as others. Each of the one or more SSIDs can be either encrypted or unencrypted depending on the intended function of the SSID. In embodiments, one or more SSIDs can be rate-limited. For example, an SSID can be rate-limited such that the SSID has only enough capacity to support traffic from the client devices 110 that have permission to use the SSID. Such a rate limitation can provide an added security measure for unencrypted SSIDs.

In embodiments, a CPE device 105 can have a single configuration SSID that is unencrypted and rate-limited. Such a configuration SSID can support flow-through provisioning of a client device 110 by allowing the client device 110 to access a configuration server 130. In embodiments, traffic received through a configuration SSID can be scrutinized within a CPE device 105 to limit the client devices 110 that are allowed to use the CPE device 105. For example, a CPE device 105 can require a specific option or sub-option to be included within a request received from a client device 110 before allowing the client device 110 to use or connect to the CPE device 105. As a further security measure, a configuration SSID can be rate-limited to accommodate only the amount of traffic needed by a client device 110 to retrieve configuration information. In embodiments, a CPE device 105 can disable an associated configuration SSID when all of the client devices 110 that are provisioned to use the CPE device 105 have retrieved configuration information.

Figure 2:
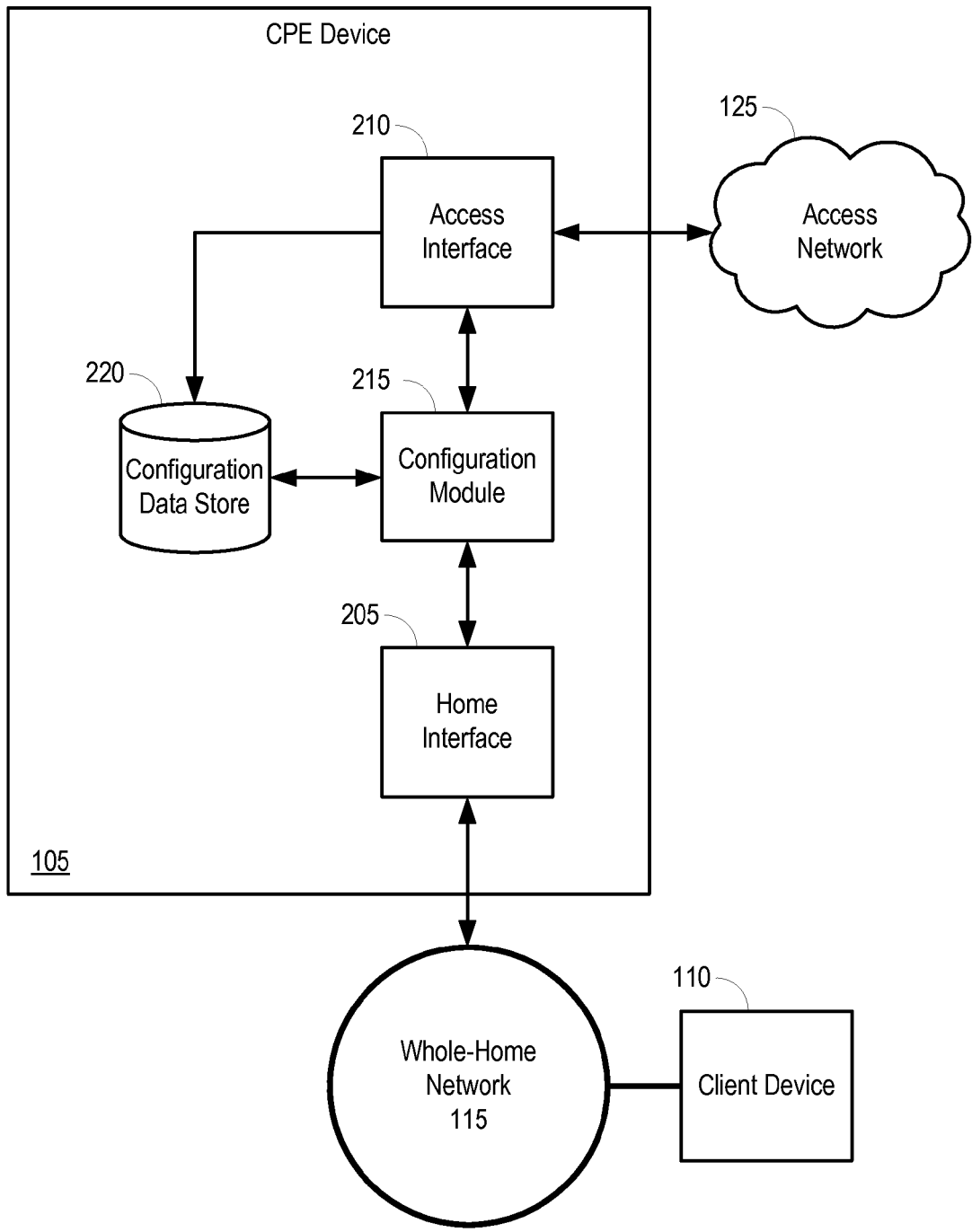
FIG. 2 is a block diagram illustrating an example CPE device operable to facilitate the pairing of a client device with a network service while minimizing user-input.

FIG. 2 is a block diagram illustrating an example CPE device 105 operable to facilitate the pairing of a client device with a network service while minimizing user-input. The CPE device 105 can include a home interface 205, an access interface 210, a configuration module 215, and a configuration data store 220.

In embodiments, the CPE device 105 can route communications to and from a client device 110 through a home interface 205, via a whole-home network 115. For example, the CPE device 105 can receive a request from a client device 110 to join a SSID associated with the CPE device 105. In embodiments, the CPE device 105 can receive a request from a client device 110 to join a MoCA network. In embodiments, the home interface 205 can include one or more SSIDs.

In embodiments, the CPE device 105 can retrieve configuration information from a configuration server 130 of FIG. 1 through an access interface 210, via an access network 125. Configuration information can include, for example, SSIDs, passwords associated with SSIDs, MoCA network configuration parameters, MoCA network security password parameters, information identifying client devices 110 having permission to access the CPE device 105, information associating a client device 110 with the CPE device 105, and other information. In embodiments, configuration information received through the access interface 210 can be stored within a configuration data store 220.

In embodiments, a configuration module 215 can allow or deny a request from a client device 110 to join a SSID associated with the CPE device 105. For example, when a client device 110 makes a request to join an encrypted SSID, the client device 110 can send a password associated with the encrypted SSID to the CPE device 105. The configuration module 215 can compare the password received from the client device 110 to the password associated with the SSID that the client device 110 is attempting to join. For example, the configuration module 215 can retrieve a password associated with a SSID from the configuration data store 220.

In embodiments, a configuration module 215 can make a determination whether a client device 110 is provisioned to use the CPE device 105. For example, when a client device 110 attempts to join a SSID associated with the CPE device 105, the configuration module 215 can identify the client device 110 and can search for client device 110 within a list of devices that are provisioned to use the specific SSID. The list of devices that are provisioned to use the SSID can be stored, for example, within the configuration data store 220. Where the requesting client device 110 is not found within the list of devices provisioned to use the SSID, the configuration module 215 can deny or ignore the request to join the SSID. In embodiments, where the configuration data store 220 does not contain needed configuration information associated with a client device 110, the configuration module 215 can access the configuration server 130 of FIG. 1 to attempt to discover the client device's authorization or configuration.

Figure 3:
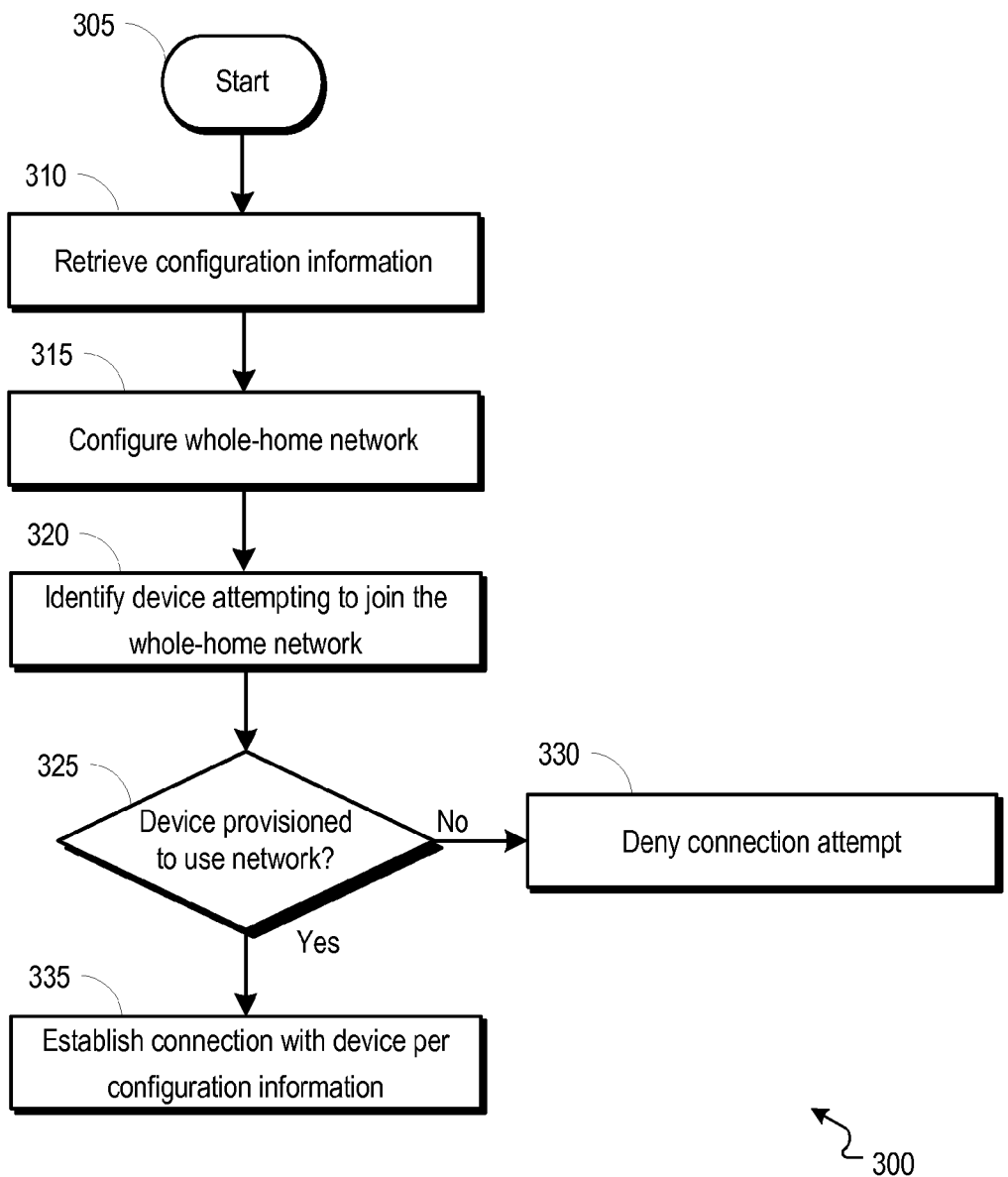
FIG. 3 is a flowchart illustrating an example process operable to facilitate the secure connection of a client device to a whole-home network.

FIG. 3 is a flowchart illustrating an example process 300 operable to facilitate the connection of a client device to a secured whole-home network. In embodiments, the process 300 can be completed by a CPE device 105 of FIG. 1. The process 300 can begin at 305, when a CPE device 105 of FIG. 1 is connected to an access network 125 of FIG. 1.

At 310, configuration information associated with the CPE device 105 can be retrieved. In embodiments, a configuration server (e.g., configuration server 130 of FIG. 1) associated with the CPE device 105 can be identified, and the CPE device 105 can retrieve configuration information from the identified configuration server. For example, when the CPE device 105 is connected to an access network 125, the CPE device 105 can receive the location of a configuration server upon joining a WAN 120 of FIG. 1. The CPE device 105 can then retrieve a configuration file (e.g., file containing configuration information for the CPE device 105) from the identified configuration server.

At 315, a CPE device 105 can configure one or more whole-home networks. In embodiments, the CPE device 105 can configure one or more whole-home networks 115 using the retrieved configuration information. For example, the CPE device 105 can configure one or more SSIDs on a wireless LAN home network according to the retrieved configuration information. In embodiments, SSIDs and passwords associated with the SSIDs can be configured using a random algorithm or they can be tied to a specific algorithm that uses an account number associated with a subscriber, a serial number associated with a device, or some other readily available seed. In embodiments, SSIDs or other home networks may be configured as unsecured networks.

At 320, the CPE device 105 can identify a client device attempting to join a configured whole-home network. In embodiments, the CPE device 105 can identify the client device (e.g., client device 110 of FIG. 1) and can identify a service the client device is requesting and/or a SSID on a wireless LAN the client device is attempting to join.

At 325, a determination can be made whether the client device is provisioned to use the configured whole-home network. The determination whether the client device is provisioned to use the configured whole-home network can be made, for example, by a configuration module 215 of FIG. 2. For example, when a client device 110 attempts to join a wireless SSID, the CPE device 105 associated with an access point that is associated with the SSID can verify, using the configuration information, whether the client device 105 is attached to a specific subscriber's account and to what services the client device 105 is entitled. In embodiments, when a client device 110 makes a request to join an encrypted SSID associated with the configured whole-home network, the client device 110 can use a password associated with the encrypted SSID, and where the client's password matches the password configured for the specific SSID, the determination can be made that the client device 110 is provisioned to use the whole-home network. In embodiments, the configuration module 215 can search for the client device 110 within a list of devices that are provisioned to use the configured whole-home network. Where the client device 110 is found within the list of devices that are provisioned to use the whole-home network, the determination can be made that the client device 110 is provisioned to use the whole-home network. In embodiments, where the determination is made that the client device 110 is not provisioned to use the configured whole-home network, the CPE device 105 can reject the client device's attempt to join the network at 330 even if it has used the correct password for that SSID.

If, at 325, the determination is made that the client device 110 is provisioned to use the configured whole-home network, the process 300 can proceed to 335. At 335, a connection between the client device 110 and the CPE device 105 can be established according to the configuration information. For example, the client device 110 can be allowed to access one or more services that the client device 110 has permission to use over the provisioned SSID. In embodiments, the CPE device 105 can be configured to provide a level of quality of service (QoS) to a client device 110 based upon a status of the device. For example, the CPE device 105 can be configured to provide a higher level of QoS to devices that are provided to a subscriber by a service-provider and a lower level of QoS to devices provided to a subscriber by a source other than the service provider.

Figure 4:
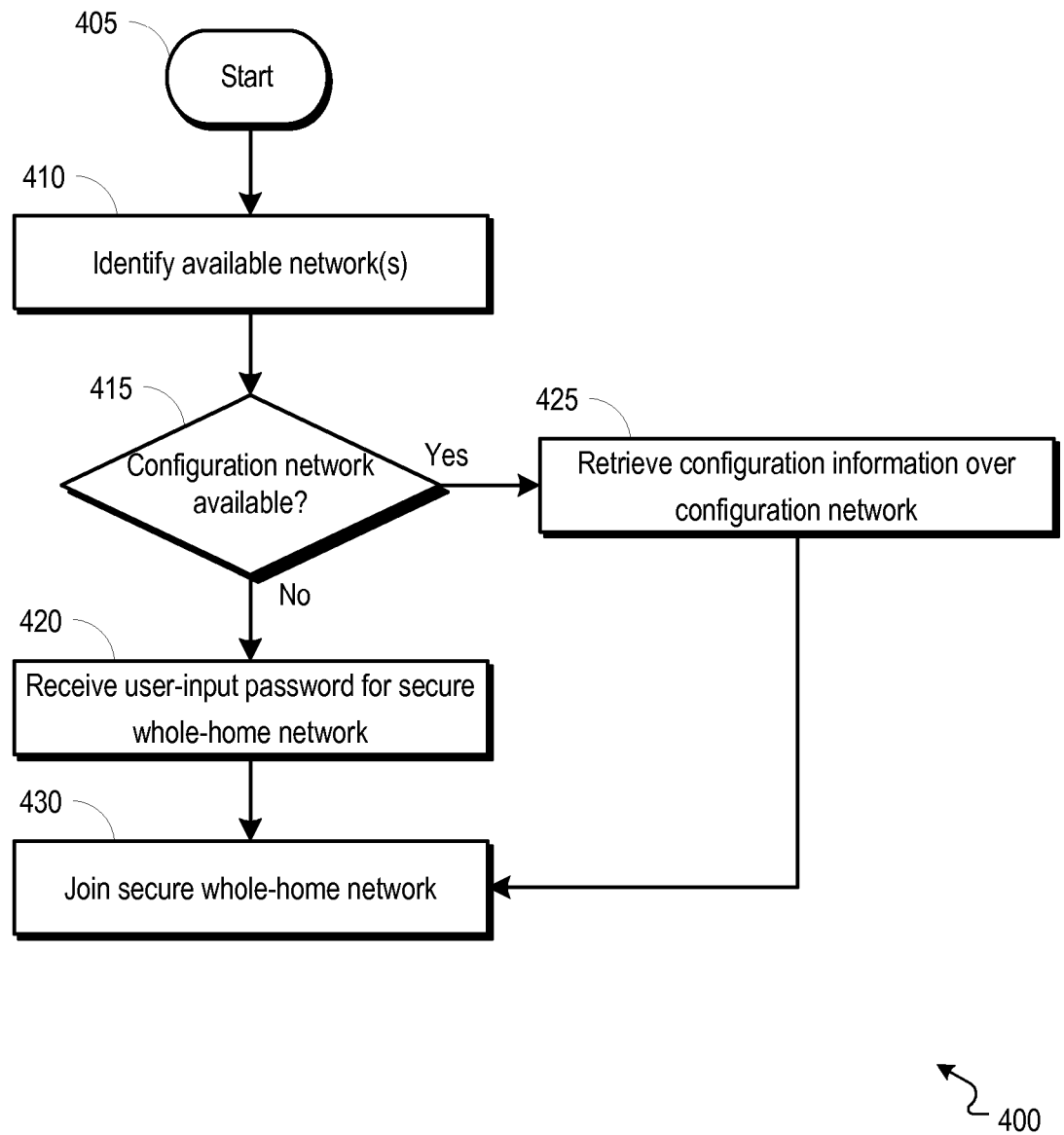
FIG. 4 is a flowchart illustrating an example process operable to facilitate the connection of a client device to a whole-home network while minimizing user-input.

FIG. 4 is a flowchart illustrating an example process 400 operable to facilitate the connection of a client device capable of multiple home networking technologies to a secured whole-home network while minimizing user involvement. The process 400 can begin at 405 when a client device attempts to join a secured whole-home network. In embodiments, a client device (e.g., client device 110 of FIG. 1) can seek a connection to a CPE device (e.g., CPE device 105 of FIG. 1) via a secured whole-home network (e.g., MoCA network, WLAN, personal area network (PAN), etc.). In embodiments, a client device may be required to receive a network password before joining a secured whole-home network.

At 410, one or more networks that are available to the client device can be identified. In embodiments, the client device can identify secured and unsecured networks that the client device is within range of.

At 415, a determination can be made whether an unsecured home network is available for the client device to join. For example, the unsecured home network can be a configuration network. It should be understood that the client device can join a configuration network that is secured. In embodiments, a client device may be capable of connecting to both a MoCA network and a WLAN network, either of which may have secured or unsecured choices. Where a client device can connect to both a MoCA network and a WLAN network, a user can be presented with the option to connect to either or both the MoCA network and the WLAN network. In embodiments, a WLAN SSID can be encrypted or unencrypted. Where the WLAN SSID is unencrypted, the client device can join the WLAN SSID without first receiving a password associated with the SSID. If the determination is made that an unsecured network is not available for the client device to join, a network password associated with the secured whole-home network (e.g., MoCA whole-home network) can be received from a user input at 420.

If, at 415, the determination is made that an unsecured network is available for the client device to join, the process 400 can proceed to 425. At 425, the client device can retrieve configuration information from a configuration server (e.g., configuration server 130 of FIG. 1) via a connection to the unsecured network. In embodiments, the configuration information can include a network password associated with a MoCA whole-home network that the client device is attempting to join. In embodiments, a subscriber can be precluded from changing a network password associated with a CPE device. In embodiments, where the subscriber is given the ability to change a network password associated with a CPE device, a factory reset mode can be implemented within the CPE device such that the network password can be reset to the CPE device's original password. After receiving the network password, the client device can join the secured whole-home network at 430.

Figure 5:
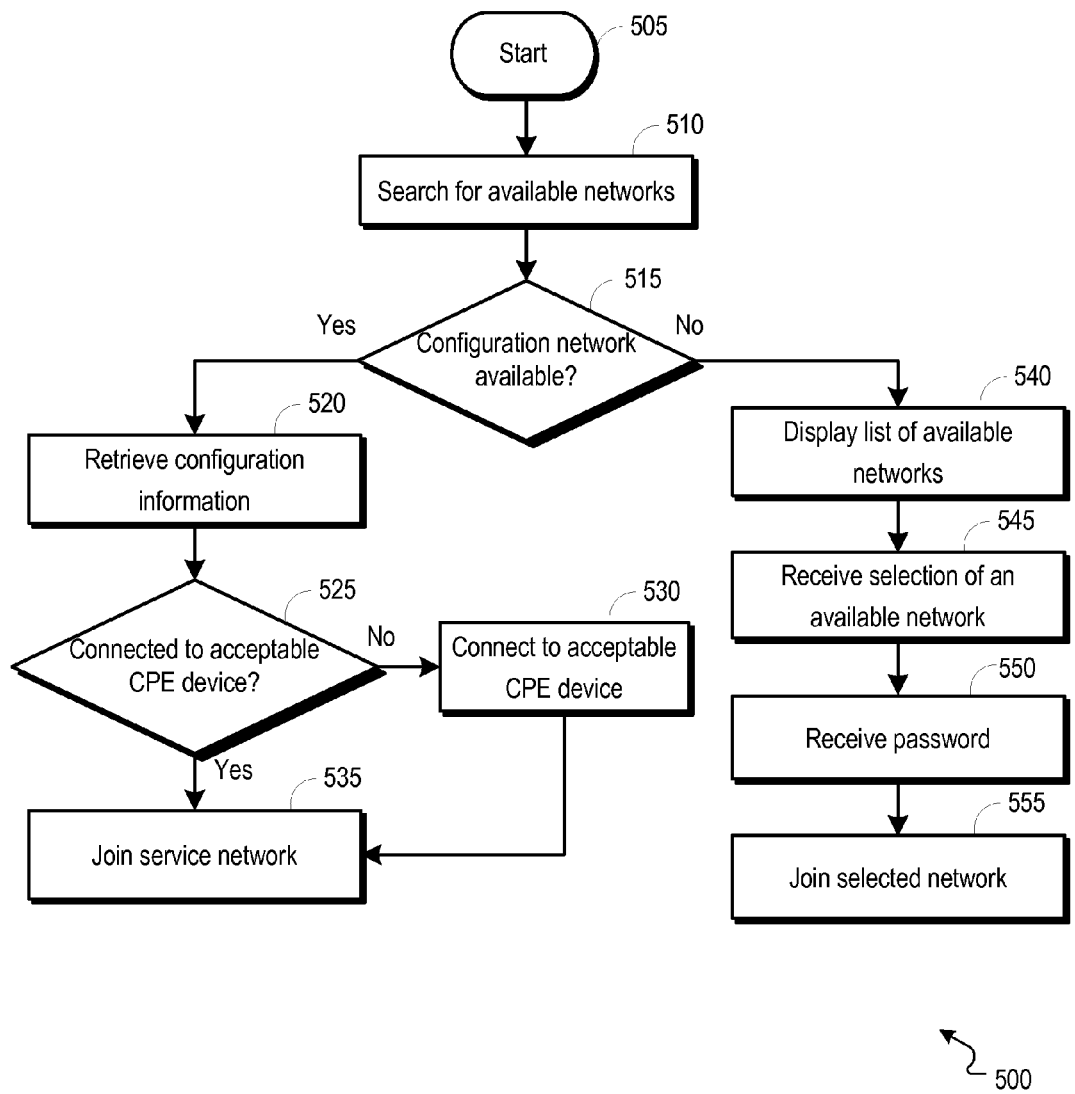
FIG. 5 is a flowchart illustrating an example process operable to facilitate the pairing of a client device with a network service while minimizing user-input.

FIG. 5 is a flowchart illustrating an example process 500 operable to facilitate the pairing of a client device with a network service while minimizing user involvement. The process 500 can begin at 505 when a client device initializes. In embodiments, a client device (e.g., client device 110 of FIG. 1) can initialize when the client device is powered on or otherwise reset.

At 510, the client device can search for the availability of one or more networks. In embodiments, the client device can search for encrypted and unencrypted networks of which the client device is within range. In embodiments, the client device can search for and identify one or more configuration SSIDs associated with one or more WLANs of which the client device is within range.

At 515, a determination can be made whether a configuration network is available for the client device to join. For example, the available configuration network can be an unencrypted configuration network or an encrypted configuration network for which the client device has registration information (e.g., a password associated with the encrypted configuration network, etc.). Where the determination is made that an unencrypted configuration network is available, the client device can retrieve configuration information from a configuration server (e.g., configuration server 130 of FIG. 1) through the unencrypted configuration network connection at 520. For example, the client device can identify an appropriate configuration server from information stored on the client device, or a CPE device can identify an appropriate configuration server for the client device. In embodiments, the unencrypted network connection can be a SSID on a WLAN, a PAN connection (e.g., Bluetooth connection, ZigBee connection, etc.) without security, or any other open network connection. In embodiments, where more than one unencrypted configuration SSIDs are available, the client device can select the SSID having the strongest signal through which to retrieve configuration information. In embodiments, where more than one unencrypted configuration network choice is available, the client device can select the configuration choice having the lowest amount of traffic through which to retrieve configuration information. In embodiments, the configuration information can include information identifying services that the client device is provisioned to receive, one or more SSIDs or other network identifiers and one or more CPE devices through which the client device may receive services, password(s) associated with specific SSIDS and/or home networks, as well as other information.

At 525, a determination can be made whether the client device is connected to an acceptable CPE device and home network. In embodiments, the CPE device to which a client device is connected can be a gateway or an access point associated with a gateway, or any other device that is operable to route communications to and from a client device (e.g., a cable modem, a wireless router including an embedded cable modem, a digital subscriber line (DSL) modem, a mobile hot-spot router, a MoCA node, etc.). In embodiments, the home networking choices can include Wi-Fi, ZigBee, Bluetooth, MoCA among many others. For example, the client device can be connected to a CPE device through an unencrypted configuration SSID through which the client device retrieves the configuration information. In embodiments, the determination whether the client device is connected to an acceptable CPE device can be based upon the configuration information received by the client device. For example, an acceptable CPE device can be a CPE device that the client device is provisioned to use. In embodiments, an acceptable CPE device can be a CPE device that has been identified as having sufficient spare capacity to support another client device.

If, at 525, the determination is made that the client device is not connected to an acceptable CPE device, the process 500 can proceed to 530. At 530, the client device can connect to an acceptable CPE device. In embodiments, the client device can search for one or more of the WLAN SSIDs or other home networks that are identified in the received configuration information. In embodiments, where more than one acceptable CPE device is available for the client device to join, the client device can join the CPE device having the strongest signal.

If, at 525, the determination is made that the client device is connected to a correct CPE device, the process 500 can proceed to 535. At 535, the device can connect to a service home network (e.g., video SSID, data SSID, hot-spot SSID, etc.) associated with the CPE device that the client device is connected to. In embodiments, the client device can join an SSID that the client device is provisioned to join according to the configuration information. For example, the CPE device can examine a request from a client device to determine whether the client device is provisioned to receive the service that is requested. In embodiments, the client device can join the SSID by outputting a password to the associated CPE device. For example, the password can be received by a client device within the configuration information.

Returning to 515, if the determination is made that an unencrypted configuration home network is not available, the process 500 can proceed to 540. At 540, a list of available home networking connections (e.g., SSIDs that were identified by the client device at 510) can be displayed. In embodiments, the displayed home networking connections can include encrypted and unencrypted SSIDs associated with CPE devices of which the client device is within range. For example, SSIDs having an acceptable signal level can be displayed within the list of available SSIDs. In embodiments, the list of available SSIDs can be displayed to a user of the client device.

At 545, a selection of an available home network connection from the displayed list of available home network connections can be received by the client device. In embodiments, the client device can prompt a user to select one of the home network connections from the displayed list of home network connections. For example, a user can be instructed to check a label or sticker on a CPE device to determine a SSID and an associated password for a desired service. The user can then select the appropriate SSID from a displayed list of SSIDs.

At 550, a password associated with the selected home network connection can be received by the client device. In embodiments, the client device can prompt a user to input a password associated with the selected SSID, and the user can input the password associated with the selected SSID. In embodiments, the client device can prompt a user to input a password associated with a MoCA network, and the user can input the password associated with a selected MoCA network. After the correct password is received by the CPE device associated with the selected home network connection, the client device can join the selected home network at 555.

Figure 6:
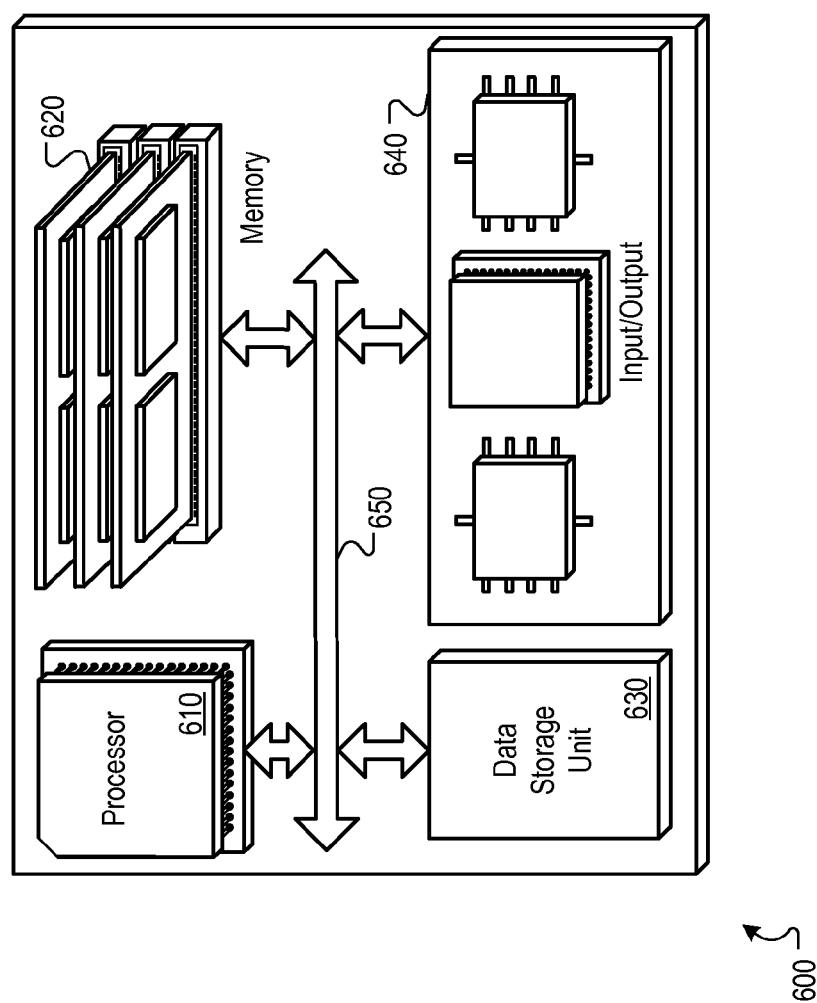
FIG. 6 is a block diagram of a hardware configuration operable to facilitate the pairing of a client device with a network service while minimizing user-input.

FIG. 6 is a block diagram of a hardware configuration 600 operable to facilitate the pairing of a client device with a network service while minimizing user-input. It should be understood that the hardware configuration 600 can exist in various types of devices. The hardware configuration 600 can include a processor 610, a memory 620, a storage device 630, and an input/output device 640. Each of the components 610, 620, 630, and 640 can, for example, be interconnected using a system bus 650. The processor 610 can be capable of processing instructions for execution within the hardware configuration 600. In one implementation, the processor 610 can be a single-threaded processor. In another implementation, the processor 610 can be a multi-threaded processor. The processor 610 can be capable of processing instructions stored in the memory 620 or on the storage device 630.

The memory 620 can store information within the hardware configuration 600. In one implementation, the memory 620 can be a computer-readable medium. In one implementation, the memory 620 can be a volatile memory unit. In another implementation, the memory 620 can be a non-volatile memory unit.

In some implementations, the storage device 630 can be capable of providing mass storage for the hardware configuration 600. In one implementation, the storage device 630 can be a computer-readable medium. In various different implementations, the storage device 630 can, for example, include a hard disk device, an optical disk device, flash memory or some other large capacity storage device. In other implementations, the storage device 630 can be a device external to the hardware configuration 600.

The input/output device 640 provides input/output operations for the hardware configuration 600. In embodiments, the input/output device 640 can include one or more of a network interface device (e.g., an Ethernet card), a serial communication device (e.g., an RS-232 port), one or more universal serial bus (USB) interfaces (e.g., a USB 2.0 port) and/or a wireless interface device (e.g., an 802.11 card). In embodiments, the input/output device can include driver devices configured to send communications to, and receive communications from one or more networks (e.g., whole-home network 115 of FIG. 1, access network 125 of FIG. 1, etc.).

Those skilled in the art will appreciate that the invention improves upon methods and apparatuses for pairing a client device with a CPE device. The methods, systems and apparatuses described in this disclosure enable the pairing of a client device with a CPE device upon a connection of the client device to a whole-network associated with the CPE device. The methods, systems and apparatuses described in this disclosure enable the secure pairing of a client device with a CPE device with little to no user-input.

The subject matter of this disclosure, and components thereof, can be realized by instructions that upon execution cause one or more processing devices to carry out the processes and functions described above. Such instructions can, for example, comprise interpreted instructions, such as script instructions, e.g., JavaScript or ECMAScript instructions, or executable code, or other instructions stored in a computer readable medium.

Implementations of the subject matter and the functional operations described in this specification can be provided in digital electronic circuitry, or in computer software, firmware, or hardware, including the structures disclosed in this specification and their structural equivalents, or in combinations of one or more of them. Embodiments of the subject matter described in this specification can be implemented as one or more computer program products, i.e., one or more modules of computer program instructions encoded on a tangible program carrier for execution by, or to control the operation of, data processing apparatus.

A computer program (also known as a program, software, software application, script, or code) can be written in any form of programming language, including compiled or interpreted languages, or declarative or procedural languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification are performed by one or more programmable processors executing one or more computer programs to perform functions by operating on input data and generating output thereby tying the process to a particular machine (e.g., a machine programmed to perform the processes described herein). The processes and logic flows can also be performed by, and apparatus can also be implemented as, special purpose logic circuitry, e.g., an FPGA (field programmable gate array) or an ASIC (application specific integrated circuit).

Computer readable media suitable for storing computer program instructions and data include all forms of non-volatile memory, media and memory devices, including by way of example semiconductor memory devices (e.g., EPROM, EEPROM, and flash memory devices); magnetic disks (e.g., internal hard disks or removable disks); magneto optical disks; and CD ROM and DVD ROM disks. The processor and the memory can be supplemented by, or incorporated in, special purpose logic circuitry.

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Particular embodiments of the subject matter described in this specification have been described. Other embodiments are within the scope of the following claims. For example, the actions recited in the claims can be performed in a different order and still achieve desirable results, unless expressly noted otherwise. As one example, the processes depicted in the accompanying figures do not necessarily require the particular order shown, or sequential order, to achieve desirable results. In some implementations, multitasking and parallel processing may be advantageous.

I claim:

1. A method comprising:
    determining whether a client device has configuration information associated with a first customer premise equipment device;
    when the client device does not have configuration information associated with the first customer premise equipment device, determining whether a configuration network is available for the client device to use to retrieve configuration information associated with the first customer premise equipment device, wherein the configuration network comprises an unencrypted network provided by the first customer premise equipment device;
    limiting the bandwidth allocated to the configuration network such that only configuration services are supported by the configuration network; and
    if a configuration network is available for the client device to use to retrieve configuration information associated with the first customer premise equipment device:
    retrieving configuration information associated with the first customer premise equipment device through the configuration network;
    pairing the client device with a service network associated with the first customer premise equipment device using the retrieved configuration information associated with the first customer premise equipment device; and
    assigning an internet protocol address to the client device upon a confirmation that the client device has permission to use the first customer premise equipment device.

2. The method of claim 1, further comprising, if a configuration network is not available for the client device to use:
    outputting a list of one or more networks that are available for the client device to use;
    receiving a user selection of one of the networks within the list of the one or more networks;
    receiving configuration information associated with the selected network; and
    pairing the client device with the selected network using the received configuration information.

3. The method of claim 1, wherein the service network associated with the first customer premise equipment device comprises a service set identifier associated with a wireless local area network, a multimedia over coaxial alliance network, or a personal area network.

4. The method of claim 1, wherein the retrieved configuration information comprises a password associated with the service network associated with the first customer premise equipment device.

5. The method of claim 4, wherein the service network associated with the first customer premise equipment device comprises an encrypted whole-home network.

6. The method of claim 4, wherein pairing the client device with the first customer premise equipment device comprises:
outputting the password associated with the service network to the first customer premise equipment device.

7. The method of claim 1, further comprising:
determining whether the client device has permission to use the first customer premise equipment device; and
if the client device does not have permission to use the first customer premise equipment device:
retrieving a list of one or more customer premise equipment devices that the client device has permission to use;
retrieving configuration information associated with a second customer premise equipment device, the second customer premise equipment device being one of the one or more customer premise equipment devices that the client device has permission to use; and
pairing the client device with a network associated with the second customer premise equipment device.

8. The method of claim 1, wherein the configuration information associated with the first customer premise equipment device is retrieved from an upstream server.

9. An apparatus comprising:
an interface configured to be used to identify one or more networks that are available for a client device to use;
a configuration processor operable to:
determine whether the client device has configuration information associated with a customer premise equipment device; and
determine whether a configuration network is available for the client device to use to retrieve configuration information associated with the customer premise equipment device, wherein the configuration network comprises an unencrypted network provided by the first customer premise equipment device, and wherein bandwidth allocated to the configuration network is limited such that only configuration services are supported by the configuration network;
a network interface configured to be used to retrieve configuration information associated with the customer premise equipment device through a configuration network; and
a pairing processor configured to pair the client device with a service network associated with the customer premise equipment device using the retrieved configuration information, and to assign an internet protocol address to the client device upon a confirmation that the client device has permission to use the customer premise equipment device.

10. The apparatus of claim 9, further comprising:
a display interface configured to be used to output a list of one or more networks that are available for the client device to use;
a user-interface configured to be used to receive a user-selection of one of the networks within the list of the one or more networks; and
the pairing processor being further configured to pair the client device with the selected network.

11. The apparatus of claim 9, wherein the retrieved configuration information comprises a password associated with the service network associated with the customer premise equipment device.

12. The apparatus of claim 11, wherein pairing the client device with the service network associated with the customer premise equipment device comprises:
utilizing the password associated with the service network to establish a secured connection between the client device and the customer premise equipment device.

13. One or more non-transitory computer readable media having instructions operable to cause one or more processors to perform the operations comprising:
determining whether a client device has configuration information associated with a first customer premise equipment device;
when the client device does not have configuration information associated with the first customer premise equipment device, determining whether a configuration network is available for the client device to use to retrieve configuration information associated with the first customer premise equipment device, wherein the configuration network comprises an unencrypted network provided by the first customer premise equipment device;
limiting the bandwidth allocated to the configuration network such that only configuration services are supported by the configuration network; and
if a configuration network is available for the client device to use to retrieve configuration information associated with the first customer premise equipment device:
retrieving configuration information associated with the first customer premise equipment device through the configuration network;
pairing the client device with a service network associated with the first customer premise equipment device using the retrieved configuration information associated with the first customer premise equipment device; and
assigning an internet protocol address to the client device upon a confirmation that the client device has permission to use the first customer premise equipment device.

14. The one or more non-transitory computer-readable media of claim 11, if a configuration network is not available for the client device to use to retrieve configuration information associated with the first customer premise equipment device, the instructions being further operable to cause the one or more processors to perform the operations comprising:
outputting a list of one or more networks that are available for the client device to use;
receiving a user selection of one of the networks within the list of the one or more networks;
receiving configuration information associated with the selected network; and
pairing the client device with the selected network using the received configuration information.

15. The one or more non-transitory computer-readable media of claim 13, wherein the retrieved configuration information comprises a password associated with the service network associated with the first customer premise equipment device.

16. The one or more non-transitory computer-readable media of claim 15, wherein the service network associated with the first customer premise equipment device comprises an encrypted whole-home network.

17. The one or more non-transitory computer-readable media of claim 13, the instructions being further operable to cause the one or more processors to perform the operations comprising:

determining whether the client device has permission to use the first customer premise equipment device; and if the client device does not have permission to use the first customer premise equipment device:

retrieving a list of one or more customer premise equipment devices that the client device has permission to use;

retrieving configuration information associated with a second customer premise equipment device, the second customer premise equipment device being one of the one or more customer premise equipment devices that the client device has permission to use; and pairing the client device with a network associated with the second customer premise equipment device.

18. The one or more non-transitory computer-readable media of claim 13, wherein the configuration information associated with the first customer premise equipment device is retrieved from an upstream server.

* * * * *